US 8,195,240 B2

(12) United States Patent
Jin et al.

(10) Patent No.: US 8,195,240 B2
(45) Date of Patent: Jun. 5, 2012

(54) HYBRID TIME-SPATIAL MULTIPLEXING FOR WIRELESS BROADCAST MESSAGES THROUGH ANTENNA RADIATION BEAM SYNTHESIS

(75) Inventors: Hang Jin, Plano, TX (US); John Grabner, Plano, TX (US); Li Guo, Irving, TX (US); Qingwen Liu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1086 days.

(21) Appl. No.: 12/103,406

(22) Filed: Apr. 15, 2008

(65) Prior Publication Data
US 2008/0261658 A1 Oct. 23, 2008

Related U.S. Application Data

(60) Provisional application No. 60/912,578, filed on Apr. 18, 2007.

(51) Int. Cl.
*H04W 40/00* (2009.01)
*H04J 3/00* (2006.01)
(52) U.S. Cl. ............... 455/562.1; 455/446; 370/336
(58) Field of Classification Search ............... 455/562.1, 455/561, 446; 370/336, 337, 345
See application file for complete search history.

(56) References Cited

U.S. PATENT DOCUMENTS

| | | | | |
|---|---|---|---|---|
| 6,597,927 | B1 * | 7/2003 | Eswara et al. | 455/562.1 |
| 2002/0071384 | A1 * | 6/2002 | Hall et al. | 370/203 |
| 2002/0146983 | A1 * | 10/2002 | Scherzer et al. | 455/562 |
| 2003/0211831 | A1 * | 11/2003 | Xu et al. | 455/63.3 |
| 2003/0216156 | A1 * | 11/2003 | Chun | 455/562.1 |
| 2004/0104839 | A1 * | 6/2004 | Velazquez et al. | 342/357.1 |
| 2004/0106437 | A1 * | 6/2004 | Ylitalo | 455/562.1 |
| 2004/0171407 | A1 | 9/2004 | Ninomiya | |
| 2006/0105771 | A1 | 5/2006 | Lacono et al. | |
| 2007/0135172 | A1 * | 6/2007 | Lysejko et al. | 455/562.1 |
| 2007/0191063 | A1 | 8/2007 | Lacono et al. | |
| 2008/0020751 | A1 * | 1/2008 | Li et al. | 455/424 |
| 2008/0075037 | A1 * | 3/2008 | Guo et al. | 370/329 |
| 2008/0101307 | A1 * | 5/2008 | Sindhushayana et al. | 370/337 |
| 2008/0214196 | A1 * | 9/2008 | Sambhwani et al. | 455/561 |
| 2009/0280866 | A1 * | 11/2009 | Lo et al. | 455/562.1 |

OTHER PUBLICATIONS

International Search Report and Written Opinion dated Sep. 10, 2008, cited in PCT/US2008/060335.

* cited by examiner

*Primary Examiner* — Nick Corsaro
*Assistant Examiner* — Tangela T. Chambers
(74) *Attorney, Agent, or Firm* — Edell, Shapiro & Finnan, LLC

(57) ABSTRACT

A hybrid time-spatial multiplexing technique is provided for beamforming broadcast messages to mobile stations that may be within a coverage region or cell of a base station. The coverage region is divided into a plurality of segments. The mobile stations are assigned to at least one of the segments based on their locations within the coverage region or other criteria. The base station computes beamforming antenna weights which are configured to produce a radiation beam pattern from a plurality of antennas of the base station to respective ones of each of the plurality of segments in the region. A broadcast message is transmitted to each segment of the region in a time-division multiplexed manner using the beamforming antenna weights associated with the radiation beam pattern for the corresponding segment.

25 Claims, 8 Drawing Sheets

US 8,195,240 B2

HYBRID TIME-SPATIAL MULTIPLEXING FOR WIRELESS BROADCAST MESSAGES THROUGH ANTENNA RADIATION BEAM SYNTHESIS

CROSS REFERENCE TO RELATED APPLICATIONS

The present application claims priority to U.S. Provisional Patent Application No. 60/912,578, which was filed on Apr. 18, 2007, the entirety of which is incorporated herein by reference.

BACKGROUND

Antenna arrays have found numerous applications in wireless communication systems, where a first communication device comprising a plurality of antennas transmits signals to a second communication device that comprises at least one or a plurality of antennas. For example, the first communication device may be a base station and the second communication device may be one of a plurality of mobile stations served by the base station. When the first communication device transmits to the second communication device, the first communication may beamform the transmission via its plurality of antennas to the second communication device, and likewise if the second communication device has multiple antennas, it may beamform its transmissions to the first communication device. The term "beamform" as used herein means that the signals received by a communication device on its multiple antennas from another device are coherently combined, and the signals transmitted from multiple antennas of a communication device are weighted in both phase and magnitude so that they will be coherently combined at the intended destination communication device.

Beamforming a transmission from one communication device to another communication device works well because the beamforming weights used for beamforming a transmission are selected or computed for an intended destination communication device so that the beam is directionally focused to the intended destination device. This is the case for so-called "unicast" messages that are intended for a particular destination device.

There is also a need to transmit "broadcast" or "multicast" messages that are intended for reception by multiple communication devices. However, broadcast messages cannot be beamformed in the convention sense because they are intended for reception by many or all mobile stations in a coverage region or cell. If a base station uses a radiation beam pattern that covers the entire cell to transmit a broadcast message, the broadcasted signal may scatter over entire cell and may not be reliable received by any mobile station in the coverage region. There will also be no beamforming gain achieved for the broadcast message that is sent by a radiation beam to the entire cell.

There are still other situations when a broadcast message is transmitted even though the message is actually intended for a specific mobile station. For example, when the location or spatial signature of the specific mobile station is not known, the only option available to the base station is to transmit a broadcast "paging" message in order to locate that mobile station within the coverage region.

Beamforming techniques heretofore known are not useful when transmitting a broadcast message that is intended for reception by multiple mobile stations within a coverage region of a base station. Even if a broadcast message is transmitted with a radiation beam pattern for the entire coverage region, the signal level associated with the broadcast message will be lower than that for a unicast beamformed message and the coverage or range of the broadcast message will be limited.

DETAILED DESCRIPTION

Overview

A hybrid time-spatial multiplexing technique is provided for beamforming broadcast messages to mobile stations that may be within a coverage region or cell of a base station. The coverage region is divided into a plurality of plurality of segments. The mobile stations are assigned to at least one of the segments based on their locations within the coverage region or other criteria. The base station computes beamforming antenna weights which are configured to produce a radiation beam pattern from a plurality of antennas of the base station to respective ones of each of the plurality of segments in the region. A broadcast message is transmitted to each segment of the region in a time-division multiplexed manner using the beamforming antenna weights associated with the radiation beam pattern for the corresponding segment.

Figure 1:
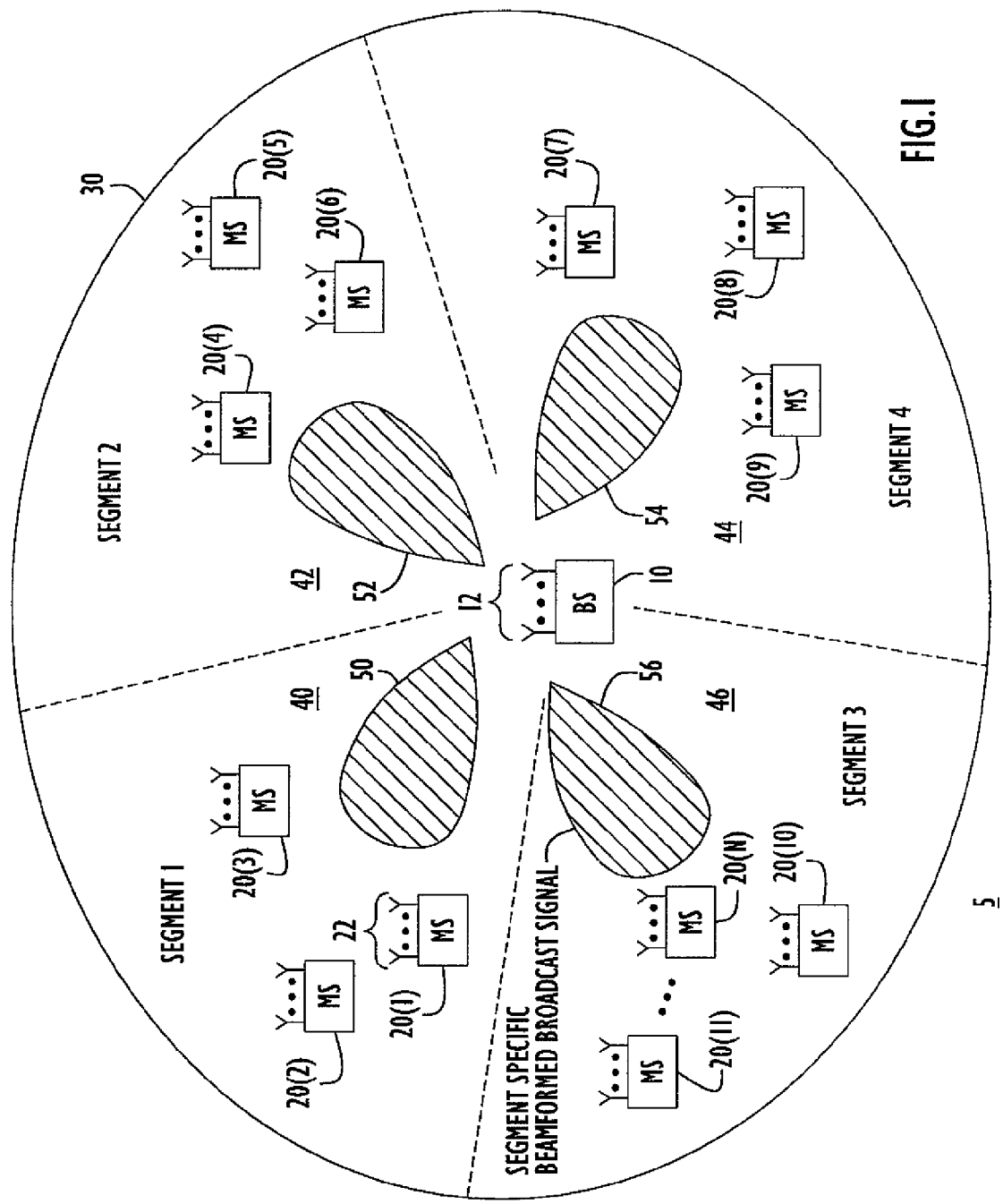
FIG. 1 is an example of a block diagram of a wireless communication system in which a base station beamforms a broadcast message to individual segments of a coverage region using a hybrid time-spatial multiplexing technique.

Referring first to FIG. 1, a wireless radio communication system or network is shown at 5 and comprises a first communication device 10 and a plurality of second communication devices 20. The first communication device 10 may be a "base station" that wirelessly communicates with second communication devices 20(1)-20(N) that are, at any given time, within a coverage region or cell shown at 30. The second communication devices 20 may also be referred to as mobile stations in that they may move about within, into and out of the region 30. The first communication device 10 may connect to wired or other data network facilities (not shown) and in that sense serves as a gateway or access point through which the second mobile communication devices 20 have access to those data network facilities. The region 30 may take on any shape or size depending on the particular environment (indoors or outdoors) and the configuration shown in FIG. 1 is not meant to be limiting as it is only merely schematically shown for purposes of explaining the techniques described herein. For simplicity, the first communication device 10 is referred hereinafter as a base station and the second communication devices 20(1)-20(N) as mobile stations. The base station 10 comprises a plurality of antennas 12 and the mobile stations 20(1)-20(N) also comprise a plurality of antennas 22. Thus, the wireless link between the base station 10 and any given mobile station is a multiple-input multiple-output (MIMO) wireless link that allows the base station 10 to using beamforming weights dedicated to a particular mobile station when transmitting a message intended for that particular mobile station. The plurality of antennas 12 on the base station 10 may be considered an antenna array as may the plurality of antennas 22 on the mobile stations 20(1)-20(N).

When a message needs to be broadcasted from the base station 10 to all (or as many as possible) of the second communication devices that are in the coverage region 30, the radiation pattern that carries the broadcast message needs to cover the entire region 30. Conventional beamforming techniques would not allow for transmission of that broadcast message with any beamforming gain because the base station cannot use the beamforming weights for each mobile station 20(1)-20(N), but would use beamforming weights suitable for broadcasting in a single radiation beam pattern throughout the entire region 30. Consequently, the coverage and reception reliability of the broadcast message will be lower than if that message had been individually beamformed to each mobile station 20(1)-20(N), which of course is impractical.

In order to exploit the benefits of beamforming and thereby extend the coverage of a broadcast message, a hybrid time-spatial multiplexing scheme is provided for transmitting the broadcast message. For example, as shown in FIG. 1, the region 30 is divided into region segments shown at 40, 42, 44 and 46. Each segment may contain, at any given point in time, zero or more mobile stations. For example, FIG. 1 shows that at a given point in time, mobile stations 20(1)-20(3) are in segment 40, mobile stations 20(4)-20(6) are in segment 42, s mobile stations 20(7)-20(9) are in segment 44 and mobile stations 20(1)-20(N) are in segment 46. The number of segments into which a region is divided depends on the size and shape of the segment and other factors described in more detail hereinafter. The base station 10 generates/synthesizes a radiation beamform pattern to individually cover each of the segments. Since a segment extends over only a portion of the region 30, each radiation beam generated by the base station 10 can be more focused to a particular segment and thus achieve more beamforming gain than a single beam covering the entire region 30. Thus, as shown in the example of FIG. 1, the base station 10 synthesizes a beam 50 for segment 40, a beam 52 for segment 42, a beam 54 for segment 44 and a beam 56 for segment 46. The mobile stations 20(1)-20(N) are organized into subgroups according to the segment in which they are located at any given time and the base station 10 may perform this grouping using direction of arrival (DOA) information, spatial signatures, distance to the base station, round-trip delay and other information, as described in more detail hereinafter. The base station 10 transmits a broadcast message on beams 50, 52, 54 and 56 in a time-division multiplexed manner so that only one or more (but generally not all) segment beams are transmitted at a time to the respective segments.

Figure 2:
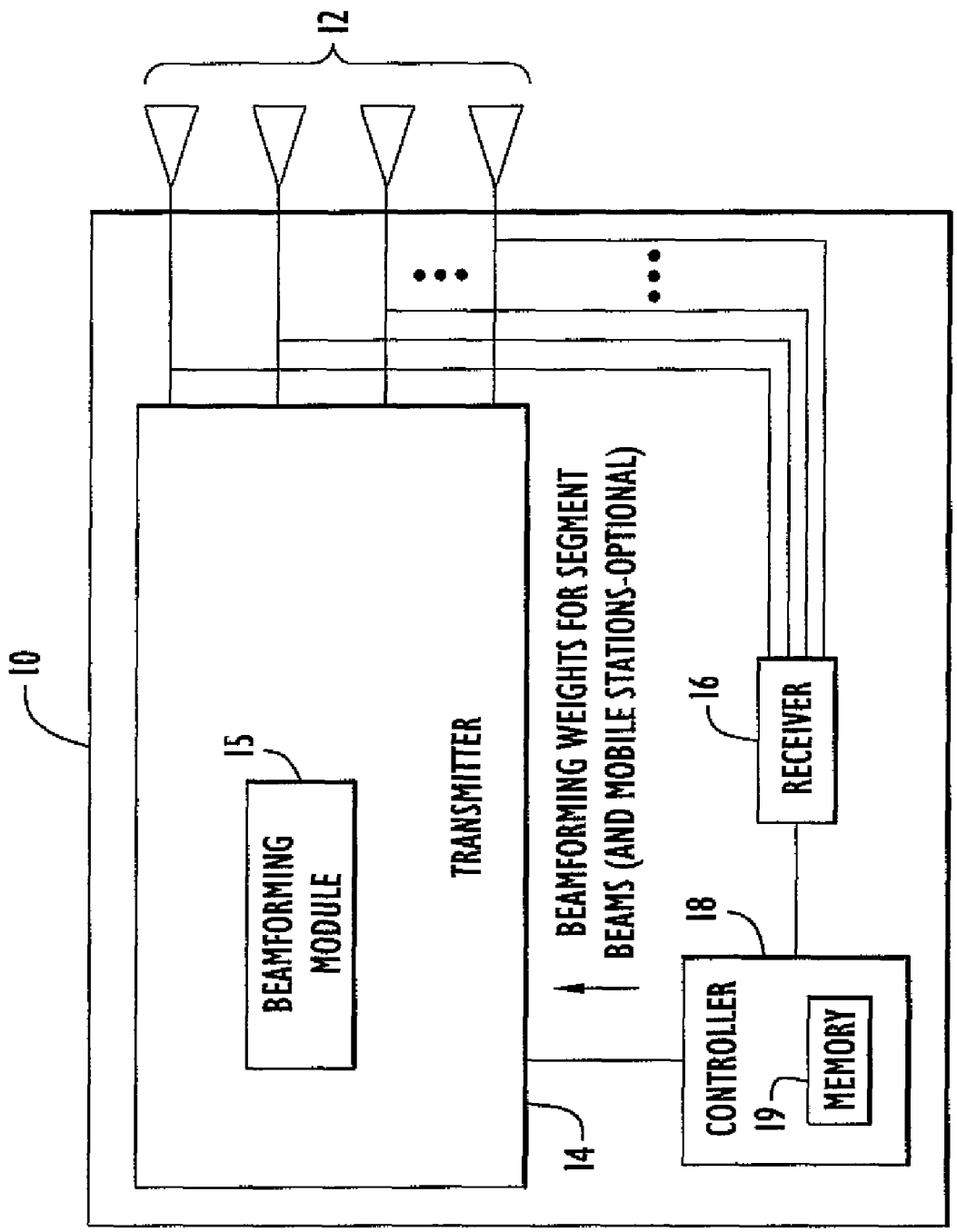
FIG. 2 is an example of a block diagram of a base station device configured to perform the hybrid time-spatial multiplexing technique.

Turning now to FIG. 2, an example of a block diagram of the base station 10 is described. The base station 10 comprises the plurality of antennas 12, a transmitter 14, a receiver 16 and a controller 18. The controller 18 supplies messages to be transmitted to the transmitter 14 to be transmitted and processes signals received by the receiver 16. In addition, the controller 18 performs other transmit and receive control functionality. Part of the functions of the transmitter 14 and receiver 16 may be implemented in a modem and other parts of the transmitter 14 and receiver 16 may be implemented in radio transmitter and radio transceiver circuits. It should be understood that there are analog-to-digital converters (ADCs) and digital-to-analog converters (DACs) in the various signal paths to convert between analog and digital signals.

The transmitter 14 may comprise individual transmitter circuits that supply respective upconverted signals (also referred to herein as "feed" signals) to corresponding ones of the antennas 12 for transmission. The receiver 16 receives the signals detected by each of the antennas 12 and supplies corresponding antenna-specific receive signals to controller 18. The receiver 16 may comprise a plurality of receiver circuits, each for a corresponding one of the antennas 12. For simplicity, the individual receiver circuits within the receiver 16 and the individual transmitter circuits within the transmitter 14 are not shown. There is a beamforming module 15 that may reside within or separate from the transmitter 14. The beamforming module 15 comprises logic that applies beamforming antenna weights to a message to be transmitted (hereinafter also called a "transmit signal") in order to generate corresponding ones of a plurality of weighted signals that are supplied to respective ones of the plurality of antennas 12. The controller 18 comprises a memory 19 or other data storage block that stores data used for the techniques described herein. The memory 19 may be separate or part of the controller 18. The controller 18 also computes or generates the beamforming weights used to generate the beams for each segment when the base station 10 is broadcasting a message to the region 30 (FIG. 1). The controller 18 also computes the beamforming weights used to generate beams for individual mobile stations when transmitting unicast messages to a mobile station.

The beamforming module 15 and controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein (and/or to store software or processor instructions that are executed to carry out the computations described herein). While FIG. 2 shows that the controller 18 is configured to compute the beamforming weights, this is not meant to be limiting. For example, the logic to perform these computations may be implemented in a controller or block that is local and dedicated to the transmitter 14, and separate from the controller 18.

Figure 3:
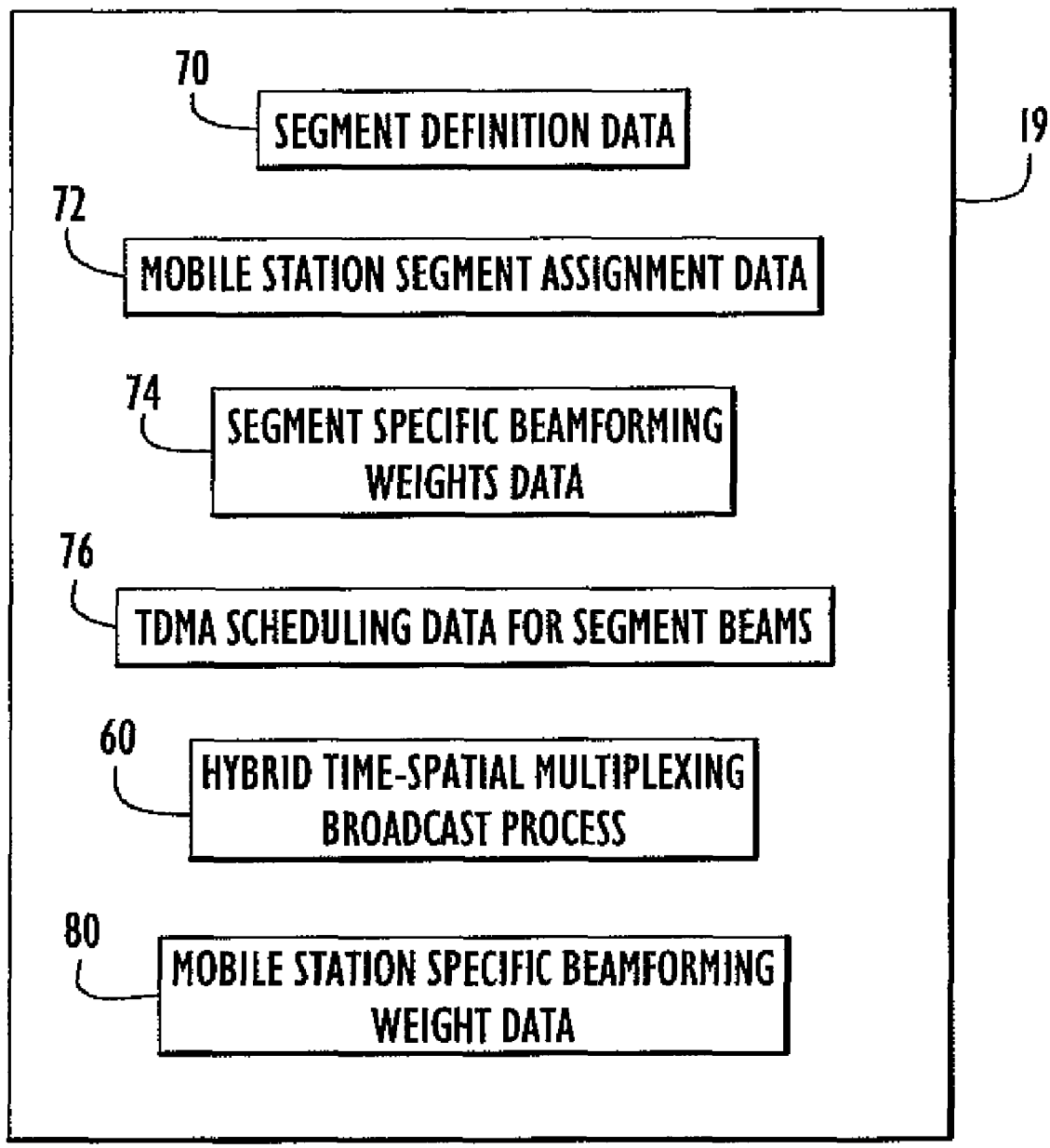
FIG. 3 is an example of a block diagram depicting data stored in a base station device for performing the hybrid time-spatial multiplexing technique.

FIG. 3 illustrates an example of the data and programs that may be stored in the memory 19. There is a set of instructions to implement the hybrid time-spatial multiplexing broadcast process shown at 60. During execution of these instructions, the hybrid time-spatial multiplexing broadcast process generates and stores segment definition data 70, mobile station segment assignment data 72, segment specific beamforming weights data 74, and time-division multiple access (TDMA) scheduling data 76 for the segment beams. The segment definition data 70 comprises data that describes or identifies how a region is divided into segments, including the number of segments and location (and boundaries) of each segment with respect to the base station 10. The mobile station segment assignment data 72 comprises data that identifies to which one or more of the segments each of the mobile stations 20(1)-20(N) is assigned at a particular instant or interval of time. Due to their mobility, mobile stations may move about a coverage region, from one segment to another segment. The base station changes the mobile segment assignment data 72 as mobile devices move about the coverage region. The segment-specific beamforming weights data 74 comprises data describing the magnitude and phase of each of the antenna weights to be used when beamforming a broadcast message to a particular segment (thereby producing the segment beam for a particular segment). The TDMA scheduling data 76 comprises data that determines the sequence and timing of beamforming a broadcast message to individual segments in a region. The memory 19 also stores mobile station specific beamforming weight data 80 that comprises the antenna weights that the base station 10 may use to beamform a unicast message to each mobile station 20(1)-20(N). The mobile station specific antenna weights may change over time as a mobile station moves with respect to the base station 10.

Figure 4:
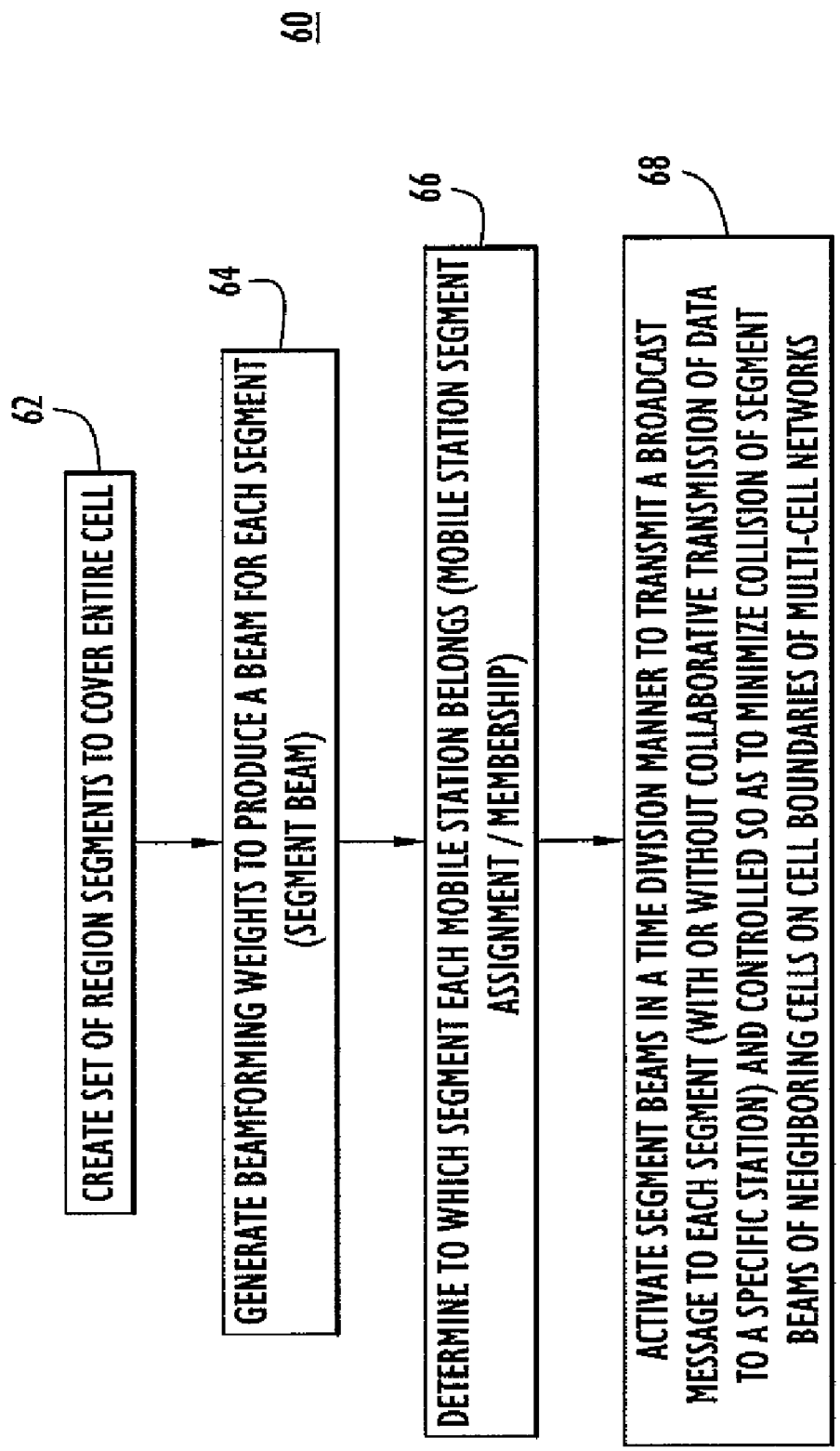
FIG. 4 is an example of flow chart depicting the hybrid time-spatial multiplexing technique.

Turning now to FIG. 4 with continued reference to FIG. 3, the hybrid time-spatial multiplexing broadcast process 60 is described in more detail. At 62, a base station's coverage region or cell is divided to create a set of region segments and the segment definition data 70 is stored in the base station 10. The segments themselves may partially overlap. Examples of coverage region or cell segmentation techniques are described hereinafter in conjunction with FIGS. 5-7. At 64, the base station 10 generates the segment specific beamforming weights that are used to produce a radiation beam pattern for each segment, hereinafter also referred to as a "segment beam". The segment specific beamforming weights data 74 is stored in the base station 10. At 66, the base station determines to which (one or more) segment each mobile station belongs or is assigned to based on data described hereinafter, and stores the mobile station segment assignment data 72. A mobile station can belong to one or more (group) of segments and a segment can contain a group of mobile stations at any given time. Grouping of mobile stations and their assignment to a segment is not fixed. The base station 10 constantly monitors the locations of mobile stations and/or other information of mobile stations (direction of arrival (DOA) information, spatial signatures, distance to the base station, round-trip delay and other information, as described in more detail hereinafter) and adjusts their segment assignment accordingly. At 68, when a broadcast message is to be sent to all mobile stations in a coverage region, the base station activates the segment beams in a TDMA manner according to the TDMA scheduling data 76. One or more segment beams may be activated at time. The active segment beam(s) carry the broadcast message to the mobile stations that are in a corresponding segment. Segment beam activation may be carried in a TDMA manner and on an "as needed" basis. For example, if a coverage area for a base station has three segments, and each segment contains 10 mobile stations at a given instant of time, segment beam 1 may be activated for segment 1 at time slot 1, segment beam to may be activated for segment 2 at time slot 2, and segment beam 3 may be activated for segment 3 at time slot 3. Then, at time slot 4, segment beam 1 is again activated for segment 1, and so on. If the base station determines that segment 2 contains no mobile stations, then activation of segment beam 2 can be skipped such that the base station switches between segment beam 1 and segment beam 3. The duration of activation of a segment beam can vary from segment beam to segment beam and depending on segment loading and message loading.

As described further hereinafter, when activating the segment beams at 68 for broadcasting a message to individual segments, the base station may also coordinate the beamforming transmission of unicast messages to one or more mobile stations within a segment (during that segment's time slot). For example, if during time slot 1, segment 1 is scheduled to receive a broadcast message via segment beam 1, the base station may also send unicast traffic data to a mobile station in segment 1 using the beamforming weights for that mobile station. This may be desirable if the reception of a unicast data message is dependent on the reception of a broadcast message. The coordinated transmission of unicast data during a segment beam time slot is described further hereinafter in conjunction with FIG. 8.

In addition, in the case of a multi-cell or region network, the timing of the segment beams may be controlled so as to minimize collisions of segment beams of neighboring coverage cells or regions at their boundaries. The controlled timing of segment beams in a multi-cell network or system is described hereinafter in conjunction with FIG. 9.

Figure 5:
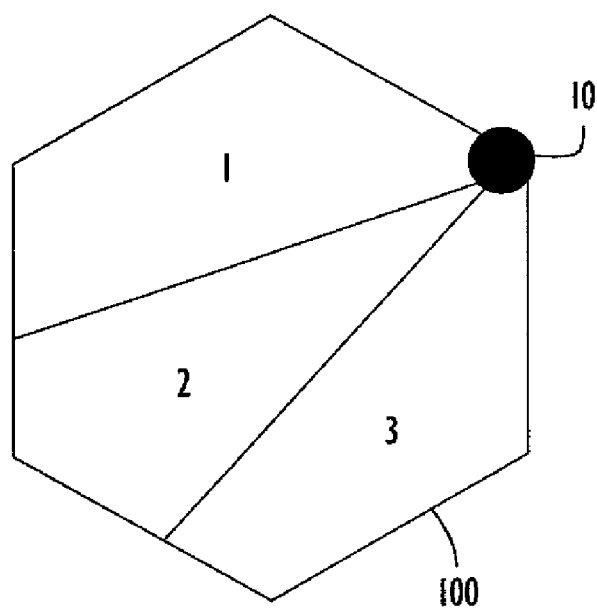
FIG. 5 illustrates an example of an arrangement for dividing a coverage region or cell into a plurality of region segments.
Figure 6:
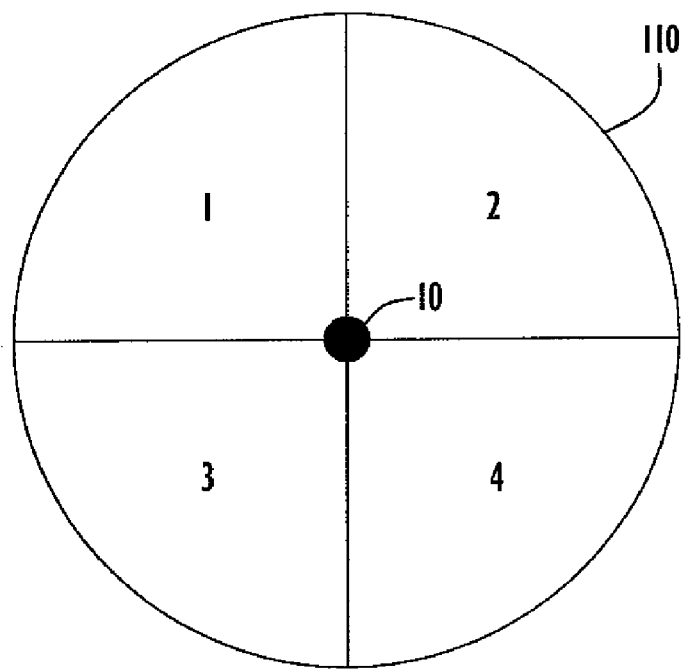
FIG. 6 illustrates another example of an arrangement for dividing a coverage region or cell into a plurality of region segments.

Referring to FIGS. 5 and 6, examples of coverage region segmentation techniques are described. Segmentation of a coverage region depends on the actual geometry of the coverage region. FIG. 5 illustrates an example of a 120° coverage region or cell 100 that is divided into three segments, segments 1, 2 and 3, each of which spans 60°. FIG. 6 illustrates an example of a 360° omni coverage region or cell 110 that is divided into four segments 1, 2, 3 and 4, each of which spans 90°.

Figure 7C:
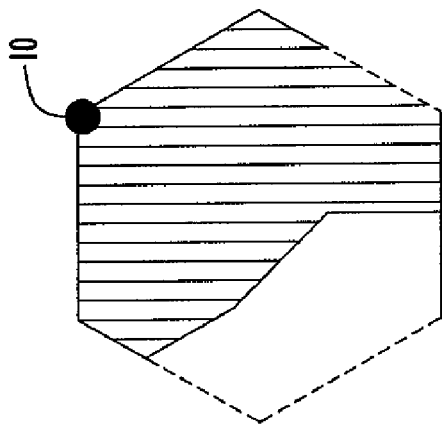
FIG. 7 illustrates an example of a coverage region that is divided into multiple segments each of which partially overlaps each other.
Figure 7B:
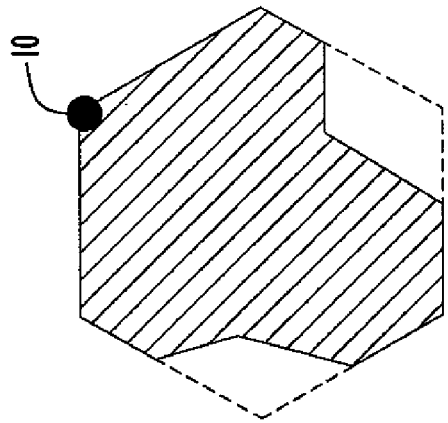
Figure 7D:
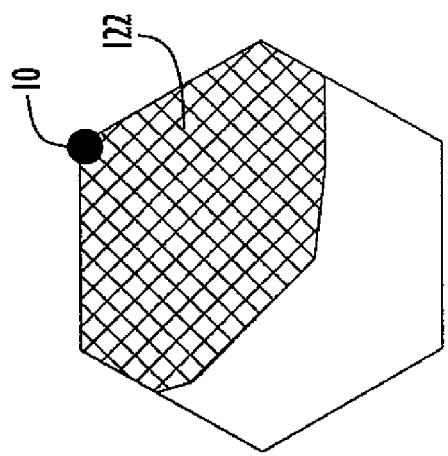
Figure 7A:
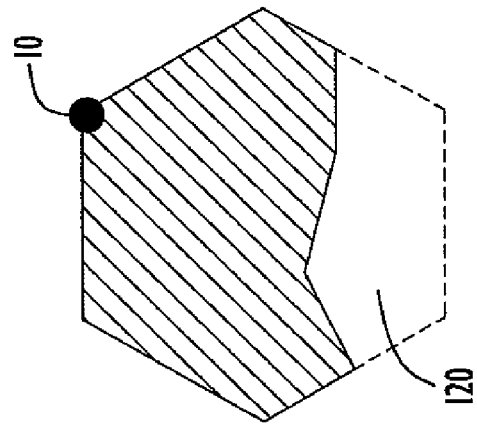

Turning to FIGS. 7A-7D, still another example of coverage region segmentation is shown where a 120° coverage region 120 is divided into three segments, segments 1, 2 and 3, all of which at least partially overlap in an area 122 of the region 120 that is close to the base station 10. FIG. 7A illustrates an example of a shape for segment 1, FIG. 7B illustrates an example of a shape for segment 2 and FIG. 7C illustrates an example of a shape for segment 3. FIG. 7D illustrates overlap area 122 of the three segments near the base station 10 in the coverage region 120.

Any mobile station can be assigned to one or multiple segments. A mobile station is said to "belong to" or "assigned" to a segment when it can receive a broadcast message through that segment's corresponding segment beam. A mobile station is said to "exclusively" belong to or assigned to a group of (two or more) segments if the mobile station can receive the broadcast message from any of the segment beams for that group of segments. For example, a mobile station that is located in the overlapping area 122 in FIG. 7D is said to exclusively belong to segments 1, 2 and 3 because the mobile station can receive a broadcast message from any one of the three segment beams. On the other hand, a mobile station is said to "inclusively" belong to or assigned to a group of segments if the mobile station is located such that the broadcast message needs to be sent using all the corresponding segment beams for that group of segments in order to ensure that the mobile station receives the broadcast message. One example of this situation is when the location of a mobile station is unknown or not sufficiently known, in which case the mobile station is deemed to inclusively belong to all of the segments of the coverage region.

In the case in which a broadcast message is intended for a mobile station whose location is unknown (and this is assigned to all segments in a coverage region) or for a mobile station that is assigned to multiple segments, the base station may transmit the broadcast message with all the relevant segment beams until the base station receives an acknowledgment that the intended mobile station has received the broadcast message.

The segment to which a mobile station is assigned may be determined through any one or more techniques, including (without limitation): mobile station location, direction of arrival (DOA) associated with signals received from a mobile station, path loss, round trip delay, spatial signature and mobile station feedback/response. Each of these techniques is now described.

Mobile Station Location. A first technique that is useful for mobile station segment assignment is to determine the physical location of a mobile station and then assign the mobile station to a corresponding segment base on the mobile station location with respect to the segment boundaries. Numerous location techniques now known or hereinafter developed may be employed to determine the location of a mobile station, examples of which include those based on time difference of arrival, receive signal strength analysis, etc.

DOA. DOA is another technique in which the direction of arrival of signals at the base station from a mobile station is determined (based on the relative strength and phase of the signals received at the individual antennas of the base station from the mobile station) and the mobile station is then assigned to the segment whose corresponding segment beam is closest to the DOA of the mobile station. Numerous techniques are known in the art for DOA determination.

Path Loss. Still another technique is to compute a path loss between the base station and a mobile station to estimate the distance between the mobile station and the base station. The base station then uses data describing the distance of each segment to the base station in order to determine to which segment the mobile station belongs using the path loss data to that mobile station.

Round Trip Delay. Yet another technique is to compute a round trip delay for signals transmitted between the mobile station and the base station and to use that data to estimate the distance between the mobile station and the base station. Again, the base station then uses data describing the distance of each segment to the base station to determine which segment the mobile station belongs using the round trip delay data.

Mobile Station Spatial Signature. Still another technique is to obtain the spatial signature of the mobile station and then calculate the correlation between the mobile station's spatial signature and the segment beams. As is known in the art, a "spatial signature" is the response of an array of antennas to a signal transmitted or emitted from a certain location. Mobile stations at different locations with respect to the base station will have different spatial signatures at the antennas of the base station. The spatial signature is typically represented by a vector quantity. The base station assigns the mobile station to the segment whose segment beam has the closest correlation to the mobile station's spatial signature.

Mobile Station Feedback/Response. Another technique is to assign a mobile station to a segment based on a response (e.g., an acknowledgment) received from a mobile station in response to data transmitted by the base station. For example, the base station may send a broadcast message via one of the segment beams. If the mobile station sends an acknowledgment to the base station that the broadcast message was received on one of the segment beams, the base station can then assign that mobile station to that segment for which the mobile station acknowledged reception of the broadcast message.

The radiation beam pattern for an array of antennas, e.g., antennas 12 of the base station 10 (FIG. 1), depends on the magnitudes and phases of the feed signals to each of the antennas or antenna elements. To synthesize or form a radiation beam pattern to a desired direction and pattern in order to cover a specific segment, the base station sets the magnitudes and phases of the feed signals by computing appropriate beamforming antenna weights that, when applied (e.g., mathematically multiplied) to a signal carrying a broadcast message, produces the feed signals with the necessary magnitude and phase. For example, an omni directional radiation pattern can be achieved with a circular array of antennas having a $\lambda/2$ spacing by setting the same magnitude and phase for all of the feed signals to the antennas. For a linear array having, for example eight elements and a $\lambda/2$ spacing, a radiation pattern spanning 120° in the azimuth plane can be achieved when the feed signals have the same magnitude but different phases as follows: [−312°, −208°, −52°, 0°, 0°, −52°, −208°, −312°].

For the same eight element linear antenna array, a radiation pattern spanning 40° in the azimuth plane can be achieved with the feed signals that have the same magnitude and the following phases: [135°, 100°, 30°, 0°, 0°, 30°, 100°, 135°].

Synthesis of the antenna radiation beam pattern may employ any of the optimization techniques now known or hereinafter developed. For example, it may be desirable that the signals emitted by all of the antennas have the same output power. In this case, the beamforming antenna weights are set such that all of the feed signals have the same magnitude. As another example, it may be desirable that the gain ripple of the synthesized beamforming pattern be less than a certain threshold.

As explained above, activation of the segment beams to transmit a segment-specific beamformed broadcast message to each segment may be made in a time-division multiplexed manner. For example, for a base station serving a coverage region with 3 segments in a time-division duplexed (TDD) system, the following is an example of segment beam activation scheduling.

At the $n^{th}$ time slot (frame), the base station schedules transmission of a broadcast message to segment 1 only. The broadcast message is transmitted during the n-th time slot with the corresponding segment beam for segment 1.

At the $(n+1)^{th}$ time slot, the base station schedules transmission of a broadcast message to segment 2 only. The broadcast message is transmitted during the $(n+1)^{th}$ time slot with the corresponding segment beam for segment 2.

At the $(n+2)^{th}$ time slot, the base station schedules transmission of a broadcast message to segment 3 only. The broadcast message is transmitted during the $(n+2)^{th}$ time slot with the corresponding segment beam for segment 3.

The above procedure may be repeated periodically with a period of three time slots. For any mobile station that belongs exclusively to multiple segments, the transmission of a broadcast message need only be made once to one of the segments to which that mobile exclusively belongs. For any mobile station that belongs inclusively to multiple segments, the transmission of a broadcast message is made to all of the segments to which that mobile station inclusively belongs until, for example, the base station receives an acknowledgment from the mobile station that it received the broadcast message.

Figure 8:
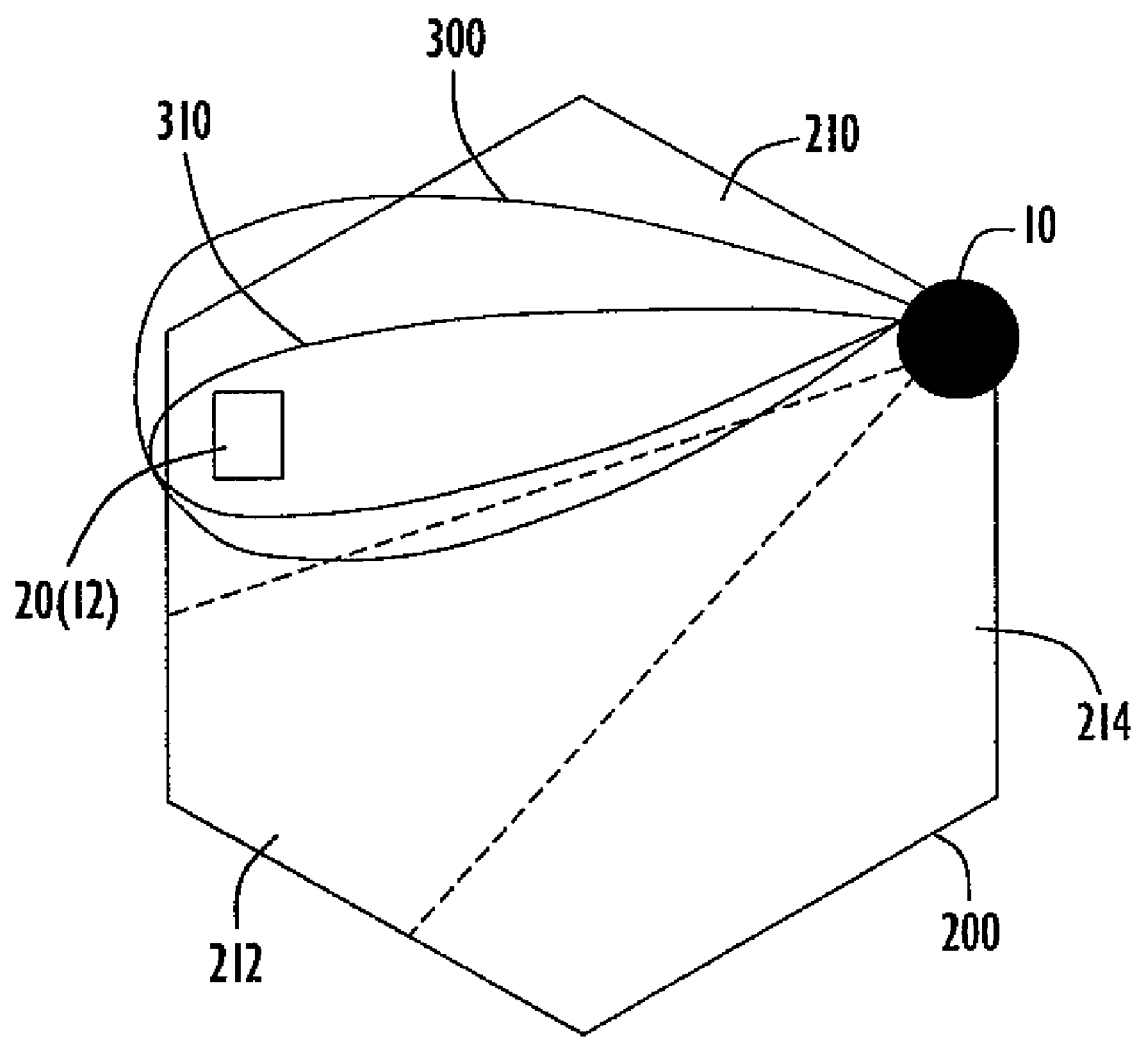
FIG. 8 illustrates an example for a technique to collaborate beamforming of a unicast message to a mobile station in a segment when beamforming of a broadcast message to that segment.

Turning now to FIG. 8, a technique is shown whereby transmission of a broadcast message can be collaborated with transmission of a unicast message to a particular mobile station, e.g., mobile station 20(12). FIG. 8 shows an example of a coverage region 200 that is divided into segments 210, 212 and 214. In this example, mobile station 20(12) is assigned to segment 210. During a first portion of time slot 1, the base station 10 schedules to transmit a beamformed broadcast message to segment 210 on segment beam 300. Mobile station 20(12) will therefore receive the broadcast message on segment beam 300. During a second portion of time slot 1, the base station can apply mobile station specific antenna weights to any unicast message that the base station 10 desires to transmit to a mobile station. Thus, during this second portion of the time slot 1 (after the segment beam carrying the broadcast message has been transmitted), the base station 10 transmits on a mobile station specific beam 310 one or more unicast messages to mobile station 20(12) using stored data for the beamforming antenna weights for mobile station 20(12). The unicast message may be transmitted during the second portion of the time slot and the broadcast message transmitted during the first portion. It should be understood that several unicast messages to separate individual mobile stations may be transmitted during the second portion of the time slot after transmission of the broadcast message during the first portion of the time slot.

Figure 9:
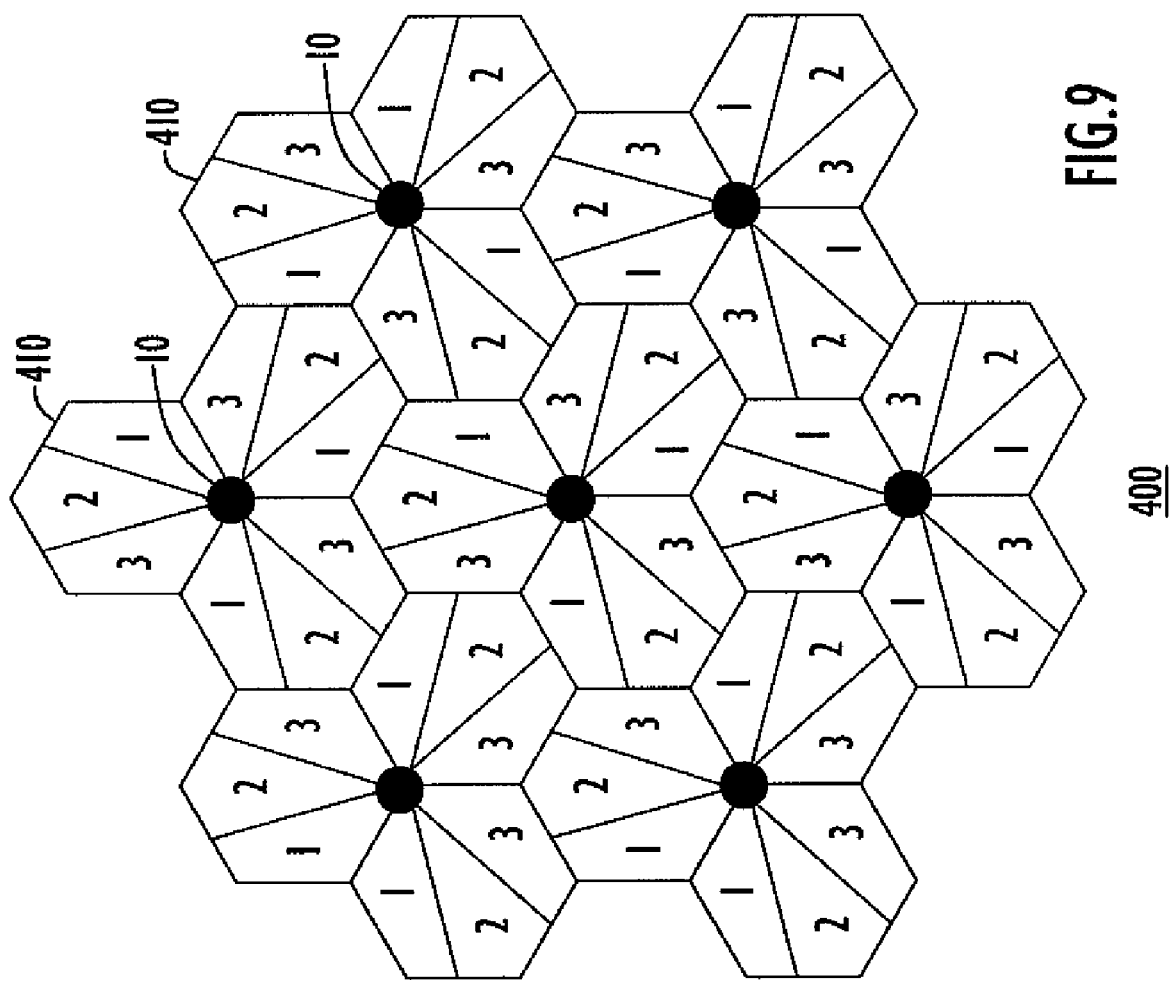
FIG. 9 illustrates an example for a technique useful in a multi-cell network in order to minimize collisions between beamformed broadcast messages to segments in adjacent cells.

FIG. 9 illustrates an example of a cell segmentation scheme for a multi-cell network shown generally at reference numeral 400. The network comprises a plurality of cells 410, each of which is divided into three segments (segments 1, 2 and 3). Each segment is assigned an index. For example, segment 1 is assigned index 1, segment 2 is assigned index 2 and segment 3 is assigned index 3. Furthermore, the arrangement of segments within neighboring or adjacent cells is arranged such that segments with the same index in neighboring or adjacent cells are not touching or otherwise sharing a boundary, or share a reduced or minimal amount of common boundary. When the base stations that serve the cells 410 in the network 400 beamform broadcast messages to segments of the cells they serve, the base stations transmit their broadcast message on segment beams to segments with index 1 during time slot 1, on segment beams to segments with index 2 during time slot 2, and then on segment beams to segments with index 3 during time slot 3, and on segment beams to segments with index 1 during time slot 4, and so on. Using this scheme, a broadcast message is beamformed to respective segments in the cells such that during the same time slot or time interval the broadcast message is not beamformed to segments of different cells that are adjacent to each other or otherwise share a boundary, or if those segments do share a boundary it is a reduced or minimal amount of common boundary. Accordingly, a broadcast message is not transmitted during the same time interval to segments of different regions that are immediately adjacent to each other, or if those segments share a common boundary they share a reduced or minimal amount of common boundary so that inter-cell (inter-region) interference of broadcasted messages is reduced. It is noted that in FIG. 9, some of the same indexed segments at least partially share a boundary in some adjacent cells. This is because, in the example of FIG. 9, each cell is divided into only three segments. Increasing the number of segments in each cell will enable an arrangement where no two same indexed segments in adjacent cells will share a boundary. Nevertheless, even in the example of FIG. 9 with three segments per cell, the amount of inter-cell interference when broadcasting messages to the cells is reduced.

Although the apparatus, system, and method for the hybrid time-spatial multiplexing techniques are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method for the hybrid time-spatial multiplexing techniques, as set forth in the following claims.

What is claimed is:

1. A method comprising:
    dividing a region in which a first communication device wirelessly communicates with one or more of a plurality of second communication devices into a plurality of segments;
    assigning respective ones of the second communication devices to a group of the segments;
    monitoring locations of the second communication devices and adjusting assignment of the second communication devices to the segments based on the monitoring;
    generating beamforming antenna weights that are configured to produce a radiation beam pattern from a plurality of antennas of the first communication device to respective ones of each of the plurality of segments in the region; and
    transmitting a broadcast message from the first communication device to each segment of the region in a time-division multiplexed manner using the beamforming antenna weights associated with the radiation beam pattern for the corresponding segment such that the broadcast message is not transmitted during the same time interval to segments of different regions that are immediately adjacent to each other, and if the segments of different regions share a common boundary, a size of the common boundary is smaller than that of a common boundary of a region without segmentation so as to reduce inter-region interference of broadcast messages.

2. The method of claim 1, wherein dividing comprises dividing the region into the plurality of segments such that none of the plurality of segments overlaps.

3. The method of claim 1, wherein dividing comprises dividing the region into the plurality of segments such that at least two of the segments at least partially overlap.

4. The method of claim 1, wherein assigning comprises assigning one or more second communication devices to more than one segment, and wherein for one or more second communication devices that are assigned to more than one segment, transmitting comprises transmitting the broadcast message to all segments to which the one or more communication devices are assigned using the corresponding beamforming antenna weights for those segments until the first communication device receives a message indicating that the one or more second communication devices has received the broadcast message.

5. The method of claim 1, wherein assigning is based on a location of a second communication device.

6. The method of claim 1, wherein assigning is based on a direction of arrival associated with signals received from a second communication device.

7. The method of claim 1, wherein assigning is based on a path loss between the first communication device and a second communication device.

8. The method of claim 1, wherein assigning is based on a round trip delay of signals between the first communication device and a second communication device.

9. The method of claim 1, wherein assigning is based on a spatial signature associated with a second communication device.

10. The method of claim 1, wherein assigning is based on a response to a broadcast message received by a second communication device when the broadcast message was transmitted by the first communication device to a segment in the region.

11. The method of claim 1, and further comprising transmitting a unicast message to particular second communication device assigned to a segment using beamforming antenna weights that are configured to form a beam intended for the particular second communication device during a time period in which a broadcast message is transmitted to the segment in which the particular second communication device is assigned.

12. The method of claim 1, wherein monitoring further comprises monitoring one or more of direction of arrival information, spatial signatures, distance to the first communication device, and round-trip delay of the second communication devices, and wherein adjusting assignment of the second communication devices to the segments is based on the monitoring.

13. A method comprising:
dividing a region in which a first communication device wirelessly communicates with one or more of a plurality of second communication devices into a plurality of segments;
assigning one or more second communication devices to at least one of the segments;
generating beamforming antenna weights that are configured to produce a radiation beam pattern from a plurality of antennas of the first communication device to respective ones of each of the plurality of segments in the region; and
transmitting a broadcast message from the first communication device to each segment of the region in a time-division multiplexed manner using the beamforming antenna weights associated with the radiation beam pattern for the corresponding segment wherein when the first communication device communicates with second communication devices in multiple regions that are adjacent to each other, said dividing and transmitting are performed such that a broadcast message is not transmitted during the same time interval to segments of different regions that are immediately adjacent to each other, and if the segments of different regions share a common boundary, a size of the common boundary is smaller than that of a common boundary of a region without segmentation so that inter-region interference of broadcasted messages is reduced.

14. An apparatus comprising:
a plurality of antennas;
a transmitter coupled to the plurality of antennas, wherein the transmitter is configured to apply beamforming weights to a transmit signal to generate corresponding ones of a plurality of weighted signals that are supplied to respective ones of the plurality of antennas;
a controller coupled to the transmitter configured to:
store data representing division of a region into a plurality of segments in which one or more mobile stations may be located;
assign mobile stations to a group of the segments;
monitor locations of the mobile stations and adjust assignment of the mobile stations to the segments;
generate a plurality of beamforming weights for each segment that are supplied to the transmitter and are computed so as to produce a radiation beam pattern from the plurality of antennas to each of the plurality of segments in the region; and
supply a broadcast message to the transmitter for beamforming transmission to each of the segments in a time-division multiplexed manner using the beamforming weights for each segment such that the broadcast message is not transmitted during the same time interval to segments of different regions that are immediately adjacent to each other, and if the segments of different regions share a common boundary, a size of the common boundary is smaller than that of a common boundary of a region without segmentation so as to reduce inter-region interference of broadcast messages.

15. The apparatus of claim 14, wherein the controller is configured to, for one or more mobile stations that are assigned to more than one segment, supply the broadcast message to the transmitter for transmission to all segments to which the one or more mobile stations are assigned using the corresponding beamforming weights for those segments until a message is received indicating that the one or more mobile stations has received the broadcast message.

16. The apparatus of claim 14, wherein the controller is further configured to supply a unicast message to the transmitter for transmission to a particular mobile station assigned to a segment using beamforming weights that form a beam intended for the particular mobile station during a time period in which a broadcast message is transmitted to the segment in which the particular mobile station is assigned.

17. The apparatus of claim 14, wherein the control is configured to monitor one or more of direction of arrival information, spatial signatures, distance to the first communication device, and round-trip delay of the mobile stations, and to adjust assignment of the mobile stations to the segments is based on one or more of direction of arrival information, spatial signatures, distance to the first communication device, and round-trip delay.

18. Logic encoded in one or more tangible media for execution and when executed operable to:
store in a base station data representing division of a region into a plurality of segments in which one or more mobile stations may be located;
assign mobile stations to a group of the segments;
monitor locations of the mobile stations and adjust assignment of the mobile stations to the segments;
generate a plurality of beamforming weights for each segment that produce a radiation beam pattern when applied to a signal that is transmitted from a plurality of antennas of the base station to each of the plurality of segments in the region; and
apply the beamforming weights for each segment to a broadcast message for beamforming transmission of the broadcast message from the base station to each of the segments in a time-division multiplexed manner such that the broadcast message is not transmitted during the same time interval to segments of different regions that are immediately adjacent to each other, and if the segments of different regions share a common boundary, a size of the common boundary is smaller than that of a common boundary of a region without segmentation so as to reduce inter-region interference of broadcast messages.

19. The logic of claim 18, and further comprising logic that is configured to, for one or more mobile stations that are assigned to more than one segment, apply the broadcast message for transmission in the time-division multiplexed manner to all segments to which the one or more mobile stations are assigned using the corresponding beamforming weights until a message is received by the base station indicating that the one or more mobile stations has received the broadcast message.

20. The logic of claim 18, and further comprising logic that is configured to supply a unicast message for transmission to a particular mobile station assigned to a segment, and logic that is configured to apply beamforming weights that form a beam intended for the particular mobile station during a time period in which a broadcast message is transmitted to the segment in which the particular mobile station is assigned.

21. The logic of claim 18, wherein the logic that assigns comprises logic that assigns mobile stations to segments based on locations of the mobile stations within the region.

22. The logic of claim 18, wherein the logic that assigns comprises logic that assigns mobile stations to segments based on direction of arrival associated with signals received from mobile stations.

23. The logic of claim 18, wherein the logic that assigns comprises logic that assigns a mobile station based on a response received by the mobile station when the broadcast message was transmitted by the base station to a segment in the region.

24. The logic of claim 18, wherein the logic operable to monitor comprises logic operable to monitor one or more of direction of arrival information, spatial signatures, distance to the first communication device, and round-trip delay of the mobile stations, and the logic operable to adjust assignment of the second communication devices to the segments is based on one or more of direction of arrival information, spatial signatures, distance to the first communication device, and round-trip delay.

25. Logic encoded in one or more tangible media for execution and when executed operable to:

store in a base station data representing division of a region into a plurality of segments in which one or more mobile stations may be located;

assign mobile stations to at least one of the segments;

generate a plurality of beamforming weights for each segment that produce a radiation beam pattern when applied to a signal that is transmitted from a plurality of antennas of the base station to each of the plurality of segments in the region; and apply the beamforming weights for each segment to a broadcast message for beamforming transmission of the broadcast message from the base station to each of the segments in a time-division multiplexed manner wherein the logic that stores data comprises logic that stores data for segments in each of a plurality of regions some of which are adjacent to each other, and wherein the logic for applying comprises logic for applying beamforming weights to a broadcast message for transmission from the base station such that the broadcast message is not transmitted during the same time interval to segments of different regions that are immediately adjacent to each other, and if the segments of different regions share a common boundary, a size of the common boundary is smaller than that of a common boundary of a region without segmentation so that inter-region interference of broadcasted messages is reduced.

* * * * *